UNITED STATES PATENT OFFICE.

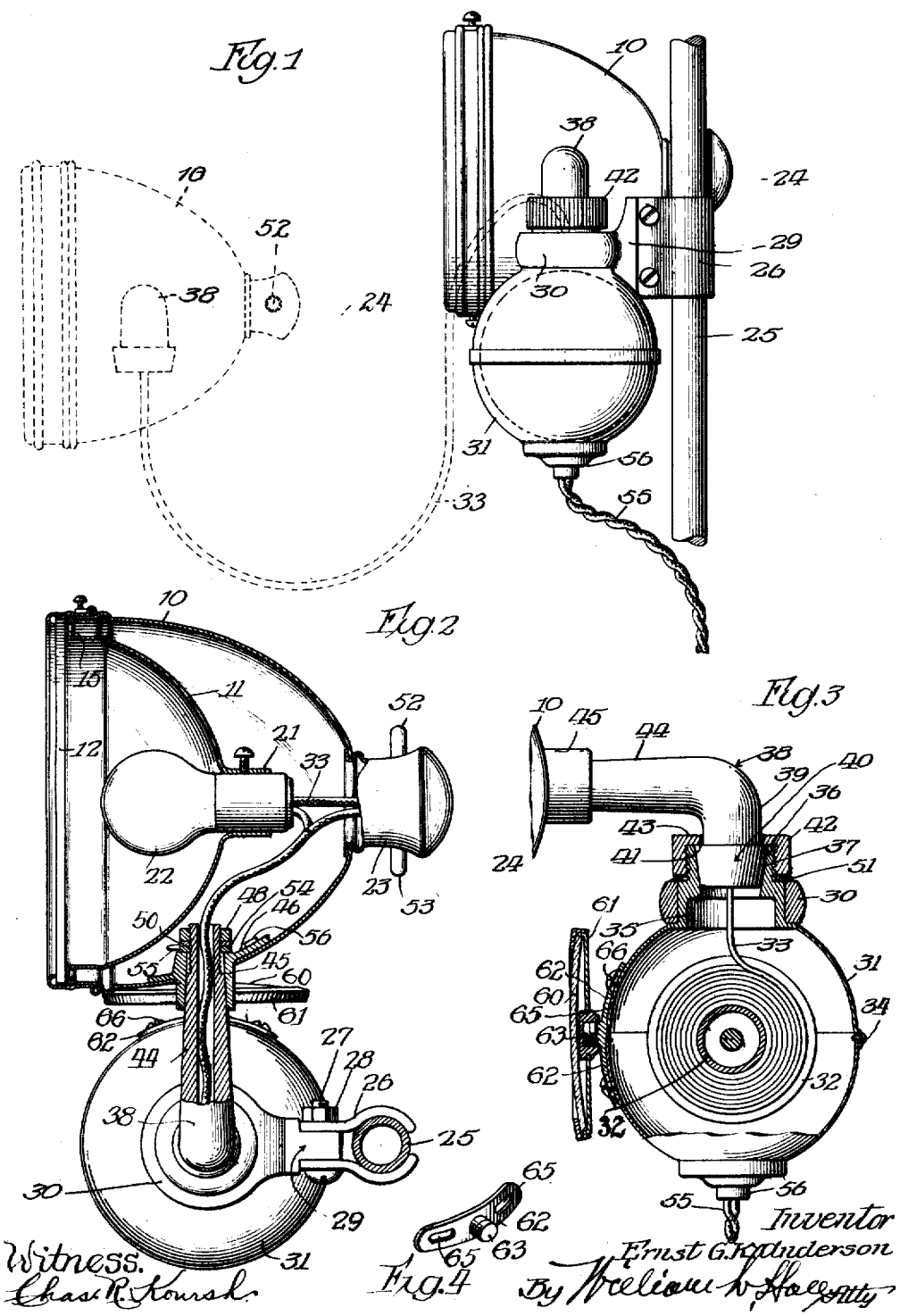

ERNST G. K. ANDERSON, OF CHICAGO, ILLINOIS, ASSIGNOR TO ANDERSON ELECTRIC SPECIALTY CO., OF CHICAGO, ILLINOIS, A CORPORATION OF ILLINOIS.

EXTENSION-LAMP.

1,309,678.   Specification of Letters Patent.   Patented July 15, 1919.

Application filed October 13, 1917.  Serial No. 196,463.

*To all whom it may concern:*

Be it known that I, ERNST G. K. ANDERSON, a citizen of the United States, and a resident of Chicago, in the county of Cook and State of Illinois, have invented certain new and useful Improvements in Extension-Lamps; and I do hereby declare that the following is a full, clear, and exact description thereof, reference being had to the accompanying drawings, and to the characters of reference marked thereon, which form a part of this specification.

This invention relates to improvements in search or spot lamps for motor and other vehicles, boats and the like, designed to be attached to any suitable located part of the vehicle frame in reach of the driver and preferably dirigibly mounted so as to be universally movable in substantially all directions whereby the light rays may be directed to any point on or at the sides of the path of the vehicle.

The object of the invention is to provide an improved lamp structure of this general character in which the lamp is connected to a source of current supply by a conductor cord of suitable length, and wherein a suitable take-up device, such as a rotative reel, is so arranged as to receive the cord when the lamp occupies its normal position, and which permits active portions of the lamp to be disconnected and withdrawn from its support so as to enable the light to be carried to any part of the vehicle within the range of the lamp cord. A lamp of this general character is shown in my pending application for U. S. Letters Patent, Serial No. 129,763.

It is the purpose of the present invention to relieve the take-up device casing from the weight of the lamp structure; to strengthen the lamp carrying member of the structure; to arrange the take-up device casing in convenient access to the lamp bracket; to improve the appearance of the structure as a whole, and to further simplify and reduce the cost of construction.

The invention consists in the combinations and arrangement of the parts shown in the drawings and described in the specification, and is pointed out in the appended claims.

As shown in the drawing:—

Figure 1 is a side elevation of a lamp embodying my invention, showing in dotted lines its extended position.

Fig. 2 is a horizontal sectional view thereof, with parts in elevation.

Fig. 3 is a sectional view of the take-up device and its casing.

Fig. 4 is a perspective view of the mirror mounting.

As shown in said drawings, 10 designates the lamp casing provided with the usual interior reflector 11 and with a lens 12 which extends across the open front of the casing and reflector. The manner of mounting the lens in place may be varied and need not be further herein described.

The reflector is provided with an axially arranged sleeve or flange 21 to receive a socket for the base of the lamp 22. In the present instance the lamp body or casing terminates in a central, rearwardly directed hollow neck portion 23 which constitutes means by which the lamp may be manipulated in its adjustments.

The lamp, when adapted to a motor vehicle, may be attached to one of the posts 25 of the wind shield frame by means of a clamp 26, consisting of two like members which have concave terminals to engage over the frame member 25 and are clamped thereon, as by means of bolts 27 extending through registering openings in the members and nuts 28 threaded to the bolts.

Said clamp is attached by said bolts 27 to a lamp supporting bracket member 29 which comprises additionally thereto a ring member 30. Said ring member constitutes in part a direct connection between the bracket and the lamp, the weight of which latter is supported by the bracket. The ring member 30 of the bracket supports a casing 31 which incloses and supports a take-up device for the cord 33 of the lamp; said take-up device consisting in the present instance of a rotative reel 32 which is rotatively mounted in any suitable manner within the casing 31. Said reel may be either manually or automatically operated to wind the conductor cord 33 thereon. The said casing for the take-up device is herein shown as made of two like semi-spherical parts or members which overlap each other and are attached to each other by means of screws or rivets 34. The casing depends from and is supported by the bracket member 30 and is located between said support and lamp. The means herein shown by which the casing is supported on the ring member 30 of said bracket consists in providing the upper member of the casing with an axial flange 35 which closely fits within the ring member 30 and may be brazed or otherwise suitably secured thereto; and said cylindric flange is provided with an externally screw threaded terminal extension 36 which is formed to provide an internal tapered portion 37 arranged above the ring member 30 of the bracket.

38 designates an L-shaped fitting constituting a bracket member for directly supporting the lamp casing, the shorter, downturned arm 39 of which is provided with an exteriorly tapered or cone member 40 which fits within the internal taper of the extension 36; and said tapered member 40 is provided with a shoulder 41. 42 designates an internally threaded nut which is threaded to the extension 36 and is provided with a central opening through which the short downturned member of the fitting 38 extends, and said nut is provided with annular, overhanging portion or flange 43 which bears against the shoulder 41 to force the tapers of the shorter arm of the fitting and the tubular extension 36 into close engagement.

The longer arm 44 of said L-shape fitting extends through a sleeve or bushing 45 that is fastened to and extends through the shell 10 of the lamp; said bushing being herein shown as provided with a flange 46 which lies against and is riveted or otherwise fastened to the lamp shell. The end of the longer member 44 of the L-shaped fitting 38 is screw threaded inside the lamp casing to receive a nut 48 by which the lamp casing is fixed to the fitting.

The longer arm 44 of the fitting 38 is exteriorly tapered near its end to engage an interior taper in the bushing 45 and the nut 48, acting against a washer 50 interposed between the nut and the inner end of the bushing, serves to force said tapered surfaces together in such a way that the frictional engagement between the tapered parts normally holds the lamp body from turning about the axis of the bushing, but permits angular adjustment of said parts by moderate pressure applied to the lamp casing.

The fitting 38 is detachably connected to the extension 36 by means of the nut 42 and is adapted to be released from the supporting bracket, constituted by the members 26, 29 and 30, by unscrewing the nut 42 from the extension, whereupon the tapered portions may be separated axially of the extension 36. The parts thus separated, the lamp casing, carrying the fitting 38, may be moved to any part of the vehicle within the length of the conductor cord 33. When the reel 32 is an automatically controlled reel, such, for instance as shown in my prior U. S. Letters Patent, No. 1,175,498, the cord is automatically wound on the reel as the lamp is returned from a distant point to the bracket. When the tapered portion 40 of the fitting 38 is engaged with the internal taper of the extension 36 and the nut screwed home, the tapered portions are forced into frictional contact in a manner to avoid normal angular movement of one part on the other, while permitting the lamp to be adjusted about the axis of the short arm of the fitting 38 with the application of moderate manual force. If desired a resilient or compressible washer 51 may be interposed between the nut 42 and the ring member 30 of the bracket to afford a yielding friction joint and also to aid in locking the nut in place. The tapered bearings are of such character (as for instance one made of brass and the other of steel) as to withstand relative frictional movement without objectionable wear.

The fitting 38 is preferably hollow to afford a conduit through which the conductor cord 33 extends, thus concealing the conductor cord. As herein shown one side of the lamp circuit includes a switch, carried as herein shown in the neck 23, and which may be of any suitable or preferred construction. Said switch is controlled by upper and lower push buttons 52, 53 in a known manner to open and close the circuit.

In order to avoid twisting of the conductor cord, which would occur by turning the lamp a number of times about the axis of the bushing 45 in one direction, a stop may be provided to limit the turning movement of the lamp relatively to the long arm 44 of the fitting 38, while permitting it to turn substantially through 360 degrees of a circle. This may be accomplished by flattening the screw threaded portion of said longer arm of the fitting and applying thereover a washer 54, having an opening to interlockingly fit on the flattened portion of said arm so as to turn therewith. Said washer is provided with a short radial arm or stud 55 which is adapted to engage a stop lug 56 formed on the bushing 45 or an extension of its flange 46.

From the foregoing description, it will be apparent that the construction is so arranged as to normally function as a universally adjustable search or spot lamp. The tapered portions between the two arms of the fitting 38 and the extension 36 on the one hand and the bushing 45 on the other hand gives practically a universal adjustment to the lamp. When it is desired to extend the lamp from the supporting bracket in order to use the lamp for a trouble lamp, the nut 42 is removed from the extension 36 so as to permit the lamp and the fitting 38 to be removed away from the bracket in the manner indicated in dotted lines in Fig. 1. The conductor cord will in practice be made of a length to correspond to the requirements of its particular use and when used on an automobile will be made sufficiently long for the lamp, when extended, to reach to any part of the vehicle.

One advantage of the construction described is that the weight of the lamp is supported solely through the medium of a bracket comprising the clamp members 26, the ring member 30, the cylindric flange 35 and extension 36 of the casing, whereby no weight is thrown upon the casing structure itself; the casing 31 being at one side of and out of line with the lamp supporting stress. The casing 31 therefore becomes merely a receptacle to receive the take-up device and is located between the support 25 and the lamp.

The conductors of the lamp cord 33 may be connected, through suitable fixed and rotative contacts, associated with the reel, to conductors 55 that are led outwardly from the casing through an opening formed in a bushing 56 that is applied to the lower side of the casing 31.

Mounted on the casing 31 is a rearwardly facing mirror 60 which is supported in a frame 61 that is carried by a fitting 62 that has a screw threaded stud 63 which engages a screw threaded socket in the frame 61. Said fitting is attached to the casing by means permitting lateral adjustment of the mirror. As herein shown the fitting 62 is provided with slots 65 through which extend attaching screws 66. Said slots permit lateral adjustment of the mirror relatively to a fixed part of the lamp supporting bracket.

I claim as my invention:—

1. An extensible lamp comprising a casing, a lamp cord, a two part bracket having means to clamp it to a fixed support, with means to attach the bracket to the lamp casing to permit the lamp casing to swing in one plane, said bracket embracing a rotative joint constructed to permit the lamp casing to swing in the other plane, a take-up device to receive the lamp cord and a casing to inclose and support said take-up device secured to and supported by said bracket on the side of the latter opposite to said means for attaching the bracket to the lamp casing, whereby the stresses produced by the weight of the lamp casing are not transmitted to the casing of the take-up device.

2. An extensible lamp comprising a casing, a lamp cord, a two part bracket having means to clamp it to a fixed support, with means to attach the bracket to the lamp casing to permit the lamp casing to swing in one plane, said bracket embracing a rotative joint constructed to permit the lamp casing to swing in the other plane, a take-up device to receive the lamp cord and a casing to inclose and support said take-up device, located between the lamp casing and said fixed support and out of the line of the lamp casing supporting stress, said rotative joint of the bracket being separable, whereby the lamp casing and a portion of the bracket may be extended from said fixed support.

3. A lamp mounting comprising a casing, a clamp member adapted to be fastened to a fixed support, a take-up device for a lamp cord, a supporting and inclosing casing therefor provided at one side with a flange, a bracket member encircling said flange and fastened to the clamp member, a lamp casing fitting, with means to removably attach one end thereof to said casing flange on the side of the bracket member opposite to the take-up device casing, and means to attach the lamp casing to the other end of said fitting.

4. A lamp comprising a casing, a clamp member adapted to be fastened to a fixed support, a take-up device for a lamp cord, a supporting and inclosing casing therefor provided at one side with a flange, a bracket member encircling said flange and carried by the clamp member, a bracket fitting, with means to removably attach one end thereof to said casing flange on the side of the bracket member opposite to the take-up device casing, and means to attach the lamp casing to the other end of said fitting, said bracket fitting being rotatively mounted in said casing flange, and the lamp casing being rotatively mounted on said bracket fitting to turn about an axis at an angle to the axis of rotation of said fitting on said flange.

5. A lamp comprising a casing, a clamp member adapted to be fastened to a fixed support, a take-up device for a lamp cord, a supporting and inclosing casing therefor provided with a cylindric flange, an annular bracket member encircling said flange and carried by the clamp member, said flange being internally tapered, a bracket fitting provided at one end with an externally tapered portion to fit the taper of said flange, with means to removably hold said fitting in said flange, and a rotative connection between the other end of said fitting and the lamp casing disposed in a plane at an angle to the axis of said flange.

6. A lamp comprising a casing, a clamp member adapted to be fastened to a fixed support, a take-up device for a lamp cord, a supporting and inclosing casing therefor, a bracket fitting, with means to support the lamp casing thereon by means permitting the casing to rotate on said fitting in one plane, and a separable rotative joint between the other end of said fitting and the take-up device casing at one side of said take-up device.

7. A lamp comprising a casing, a clamp member adapted to be fastened to a fixed support, a take-up device for a lamp cord, a supporting and inclosing casing therefor, a bracket fitting, with means to support the lamp casing thereon by means permitting the casing to rotate on said fitting in one plane, and a separable rotative joint between the other end of said fitting and the take-up device casing at one side of the take-up device, said bracket fitting being hollow whereby the lamp cord extends therethrough from the take-up device to the lamp casing.

8. A vehicle spot and trouble lamp comprising, in combination, a lamp casing, a take-up device for a lamp cord, a casing for the take-up device, and a supporting bracket having means of attachment to a vehicle and having means to support both said casings, with the point of support of the take-up device casing at one side of said bracket, whereby the stresses produced by the weight of the lamp casing are not transmitted to the take-up device casing.

9. A vehicle spot and trouble lamp comprising, in combination, a lamp casing, a take-up device for a lamp cord, a casing for the take-up device, a supporting bracket having means of attachment to a vehicle, means at one side of the bracket to permanently attach thereto the casing for the take-up device, and means at the other side of the bracket to removably and adjustably connect the lamp casing to the bracket, embracing means whereby the stresses produced by the weight of the lamp casing are not transmitted to the take-up device casing.

10. A vehicle spot and trouble lamp comprising, in combination, a lamp casing, a supporting member secured thereto, a take-up device for the lamp cord, a casing for said device including a hollow projection at one side thereof, a supporting bracket having means of attachment to a vehicle, said bracket including a ring member embracing said projection, said projection being provided with an internally tapered portion to engage an externally tapered portion on the supporting member, and means for releasably holding said tapered portions in engagement.

11. A vehicle spot and trouble lamp comprising, in combination, a lamp casing, a take-up device for a lamp cord, a casing therefor, including at one side thereof a hollow projection formed with an interior taper, and having means of connection to a vehicle, and an L-shaped arm, one end of which is formed with an exterior taper to fit the interior taper of said projection, with means to hold said tapers together and permitting said arm to swing relatively to said projection, said arm being formed at its other end with a seat on which the lamp casing is rotatively mounted.

In witness whereof I claim the foregoing as my invention, I hereunto append my signature in the presence of two witnesses at Chicago, Illinois, this 4th day of September, 1917.

ERNST G. K. ANDERSON.

Witnesses:
B. J. GRIGSBY,
EMIL NILSON.

Copies of this patent may be obtained for five cents each, by addressing the "Commissioner of Patents, Washington, D. C."